United States Patent [19]

Hermann

[11] Patent Number: 4,640,535
[45] Date of Patent: Feb. 3, 1987

[54] QUICK HOSE CONNECTOR

[75] Inventor: John T. Hermann, Livonia, Mich.

[73] Assignee: Chrysler Motors Corporation, Highland Park, Mich.

[21] Appl. No.: 780,763

[22] Filed: Sep. 27, 1985

[51] Int. Cl.[4] ............................................. F16L 3/04
[52] U.S. Cl. .................................... 285/158; 285/161; 285/242; 285/244; 285/318
[58] Field of Search ............... 285/158, 242, 243, 244, 285/248, 318, 161, 206, 220

[56]  References Cited

U.S. PATENT DOCUMENTS

| 1,486,421 | 3/1924 | Dyer | 285/243 |
|---|---|---|---|
| 3,244,056 | 4/1966 | Kern | 285/161 |
| 3,391,732 | 7/1968 | Murray | 285/158 |
| 3,499,484 | 3/1970 | Lanzoni | 285/220 |
| 3,659,880 | 5/1972 | Goldsobel | 285/161 |
| 3,674,290 | 7/1972 | McNally | 285/248 |
| 4,163,573 | 8/1979 | Yano | 285/238 |
| 4,224,464 | 9/1980 | Bunnell et al. | 285/161 |

FOREIGN PATENT DOCUMENTS

| 532465 | 9/1931 | Fed. Rep. of Germany | 285/244 |
|---|---|---|---|
| 2752761 | 5/1979 | Fed. Rep. of Germany | 285/244 |
| 495346 | 1/1956 | Italy | 285/248 |
| 650742 | 1/1963 | Italy | 285/248 |

Primary Examiner—Richard J. Scanlan, Jr.
Assistant Examiner—Anthony Knight
Attorney, Agent, or Firm—Kenneth H. MacLean, Jr.

[57]  ABSTRACT

A connector assembly for easily and quickly attaching a flexible hose to a fitting such as the inlet or outlet of a heat exchanger. The connector includes a nipple-shaped member with an enlarged bead on the end over which the hose is first extended. A cup-shaped cylinder or housing having a cylindrically shaped inner recess encircles the nipple-shaped member and hose end. A coil spring extends adjacent the wall of the inner recess and is adapted to snugly slip over the outer surface of the hose end as it is inserted past the bead of the nipple-shaped member thereby gripping the hose adjacent the radial expansion thereof produced by the bead.

5 Claims, 4 Drawing Figures

QUICK HOSE CONNECTOR

BACKGROUND OF THE INVENTION

Previously, there have been attempts to provide a connector for a flexible hose with inlet and outlet fittings of heat exchangers. In a vehicle, it is advantageous to provide auxiliary heat exchangers such as a heater core to warm passenger compartment air, the engine cooling radiator, or an oil cooler for transmission oil of an automatic transmission. Typically, flexible hoses of elastomeric material have been utilized to transmit fluid from a using device such as an automatic transmission to an oil cooler located within the radiator tank of the radiator. The hose is connected to a heat exchanger inlet or outlet fitting by clamping its end portion around a cylindrical portion of the fitting utilizing various commercially available clamps. An example of a clamp presently available is a worm gear type device. Another means to attach flexible hoses to inlet and outlet fittings is to form a metal end fitting onto a hose during manufacture of the hose. The fitting is typically connected to the hose by means of a machine compression of the metal end fitting about the hose such as a swaging operation. The metal end fitting mates with a corresponding fitting on the heat exchanger and may be secured thereto by well known mechanical fastening and sealing means.

A major disadvantage of the aforementioned use of hose clamps to secure a hose to a fitting is the problem, particularly in an assembly plant, of having a separable hose and a clamp which can require an assembler to waste time in mating the hose and the clamp. Also, clamps require excessive assembly time and, thus, are costly. In addition, some locations of heat exchanger fittings are not easily reached by a tool to tighten a clamp. Thus, a clamp-type connection may be inappropriate or very inconvenient in some applications. The aforementioned use of preformed metal end fittings shares some of the same disadvantages as clamps and, in addition, are costly and require custom designed hose applications. Also, metal end fittings occupy a relatively large space and, thus, may be inappropriate in certain cramped applications. Also, metal fittings are not readily repairable and require considerable assembly time in forming a connection.

It is obvious from the aforementioned disadvantages of these other connector types, that a simple, composite and push-on connector is desirable. One example of a push-on connector is found in U.S. Pat. No. 4,163,573. This connector utilizes a housing with an aperture into which the hose is inserted and sealed by means of an O-ring which contacts the outer surface of the hose. The hose is axially secured by means of an annularly shaped hose gripping ring which is biased axially against an inclined ring by a coil spring. The coil spring pushes the gripping ring against an inclined surface of the other ring to bind against the hose. Unlike the present invention, the spring does not operatively engage the hose itself for retention.

The subject invention concerns a connector which is far simpler than the connector described above and utilizes a different sealing means for the flexible hose.

The sealing means is a fairly conventional and time-tested nipple-type fitting over which the hose end is extended. This type of connection has proven reliable in countless applications, both in and outside of the automobile industry. The subject application also discloses a cylindrical housing which encircles the nipple fitting in precise dimensional relation thereto. A coil-type wire spring is supported within the cylindrical recess of the housing. During assembly, the hose end is slid past an enlarged end bead of the nipple fitting and then engages the spring. Full insertion of the hose over the nipple fitting causes the spring to extend over the outer surface of the hose and, thus, be in tight spacing relation between the surrounding cylindrical housing and the hose's outer surface. The spring axially extends until the end is adjacent the radial enlargement of the hose caused by the nipple's enlarged bead. When in the aforedescribed configuration, reverse movement of the hose off of the fitting forces the end of the coil spring to tightly grip the hose which, by interference with the enlarged bead of the nipple, effectively prevents the hose from being readily removed from the connector except by very large forces.

Thus, the aforedescribed connector for flexible hoses provides a simple and reliable means of connecting the flexible hose to an inlet or outlet fitting of a heat exchanger. The nipple fitting, cylindrical housing and spring are secured in a composite assembly permitting the assembler to simply insert the plain end of a flexible hose over the enlarged beaded end of the nipple fitting and thereafter simply push the hose into the cylindrical housing to make the connection therebetween. Lastly, a simple rearward pull on the hose seats the hose end in the fitting causing the spring to tightly grip the hose adjacent the enlargement thereof caused by the enlarged nipple bead.

The aforesaid advantages and features of the subject connector for flexible hoses will be even more readily understood from a reading of the following Detailed Description of a Preferred Embodiment which is shown in the drawings as follows:

IN THE DRAWINGS

DETAILED DESCRIPTION OF A PREFERRED EMBODIMENT

Figure 1:
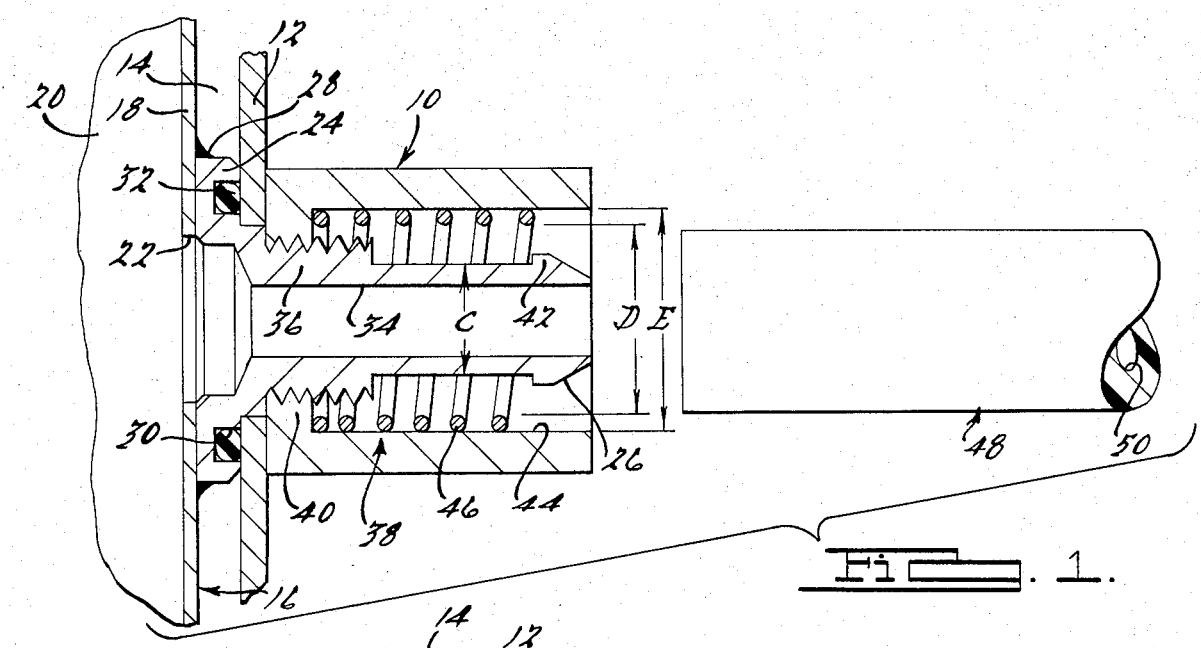
FIG. 1 is a sectional view of the subject connector and an end portion of a flexible hose in unassembled relation to one another.

In the drawings, the subject quick connector assembly 10 is shown supported by a wall 12 of a vehicle radiator. The wall 12 of the radiator encloses a fluid filled space 14 which defines the tank portion of the vehicle radiator. A transmission oil cooler 16 is partially shown within the space 14 of the radiator tank. The oil cooler assembly 16 includes a partial view of wall portion 18 thereof which defines a space 20 adapted to receive and conduct a flow of transmission oil for cooling by the engine coolant in space 14 by heat transfer through the wall 18. The wall 18 of the oil cooler is provided with a passage 22 through which the transmission oil passes. Wall 18 is attached to the base 24 of a nipple-type passage and fitting 26 by means of a fluid tight braze 28. The base 24 is provided with a cylindrical channel 30 in which an O-ring 32 is supported. The O-ring 32 sealingly engages the inner surface of the radiator tank wall 12 to prevent the leakage of engine coolant therebetween. The nipple-type fitting 26 has an axially extending passage 34 therethrough which is in fluid communication with the aperture 22 in wall 18 for the communication of fluid, such as transmission oil to be cooled. A slightly enlarged portion 36 of the nipple fitting has threads formed on its outer circumferential surface for engagement with similarly formed threaded portions of a cylindrical housing 38. Specifically, the housing 38 has an apertured end wall 40 in which the threaded portion is formed. The end wall 40 snugly engages the outer surface of the radiator tank wall 12 when in the assembled condition. The opposite end of the cylindrical housing 38 is open and encircles an enlarged diameter beaded portion 42 of the nipple-type fitting 26. In addition, the cylindrical housing 38 includes a cylindrically shaped recess 44 through which the nipple-type inlet fitting 26 extends. In addition, a coil-type wire spring 46 is supported within the interior cylindrical space formed by the housing 38. The leftwardmost coil of the spring may have a slightly larger outer diameter when in a relaxed unassembled condition so that the spring 46 is retained within the cylindrical recess 44 of the housing 38. Thus, the connector assembly 10 is a composite connector secured to the wall of the radiator tank in a leak resistant fashion ready for assembly of a flexible hose thereto as described in the next paragraph.

Figure 2:
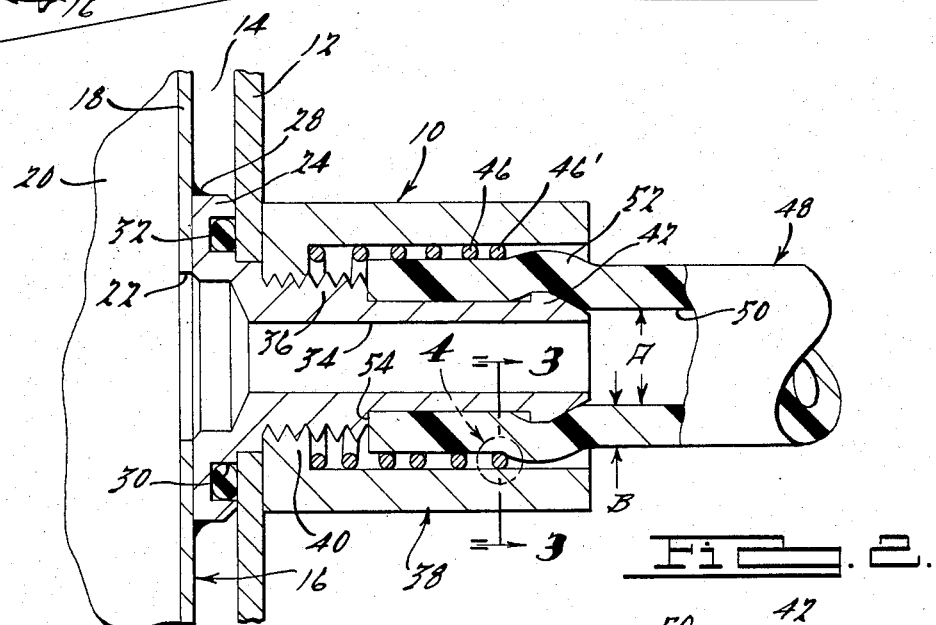
FIG. 2 is a section view similar to FIG. 1, but showing the connector and hose in an assembled condition.
Figure 3:
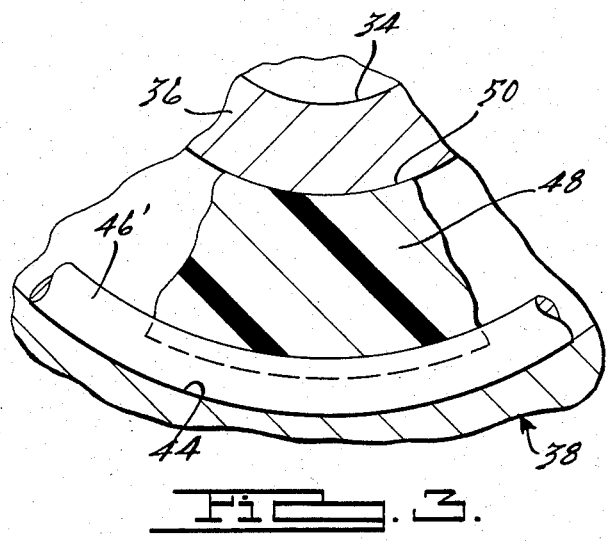
FIG. 3 is an enlarged partial section of the relationship between the nipple fitting, the flexible hose, the spring and the housing in an assembled position.
Figure 4:
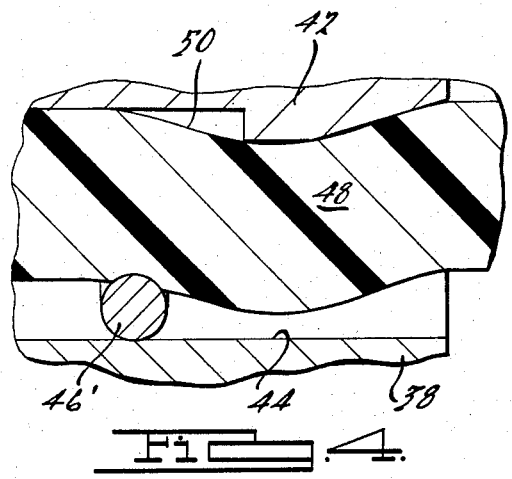
FIG. 4 is an enlarged partial view of the fitting, elastic hose, spring end housing in the vicinity of the circled area of FIG. 2.

An elastomeric hose or tube 48 and, specifically, an end portion thereof may be quickly connected to the composite connector 10 shown in FIG. 1. The hose 48 has a relatively precise wall thickness with an inner passage 50 for the conduct of fluid to be cooled. As shown in FIG. 1, the end of hose 48 is moved closely to the enlarged bead 42 of the nipple-like fitting 26. Insertion of the hose over the beaded end of the fitting is shown in FIG. 2 which causes the elastomeric hose 48 to be slightly radially expanded as identified by numeral 52. The hose then contracts radially once past the beaded portion 42 of fitting 26 and slips into the interior diameter portion of the spring 46 which is slightly smaller in diameter than the outside diameter of the hose while it is on the nipple fitting surface to the left of the bead area. Thus, the coil spring 46 snugly engages the outer surface of the hose 48. The hose 48 is moved to the left in FIG. 2 until its end portion 54 engages the enlarged portion 36. Thus, the assembler may know that the hose has been fully inserted. Subsequently, a reverse force exerted on the hose 48 to the right in FIG. 2 will cause the rightward end coil 46' to be slightly embedded in the outer surface of the hose as shown in FIG. 4 caused by the radial expansion of the hose produced by the bead portion 42 of the fitting 26. This embedding action of the coil effectively prevents disconnection of the hose 48 from the connector 10 without using greatly excessive force. To further illustrate the cooperative aspects of the enlarged bead 42, the hose 48, the end coil 46' of the spring and the inner diameter wall 44 of housing 38, reference is made to FIG. 3 which is an enlarged sectional view in the axial direction. It can be seen that a desired dimensional relationship between the aforementioned parts of the connector and hose cooperate to produce a very leak resistant connection between the hose and the connector which resist rightward or disconnecting motion of the hose with respect to the connector.

In a preferred embodiment of the connector and hose, the following table teaches the preferred relationship between dimensions which are shown on the drawings as follows:

| DIMENSION (inches): | |
| --- | --- |
| A | .325 |
| B | .130 |
| C | .345 |
| D | .590 |
| E | .720 |
| Bead Diameter (42) | .395 |

The dimensional relationship between the parts of the connector and the hose provide the relatively good sealing characteristics of the connector and its anti-removal character. The dimension A of the hose is slightly less than the dimension C so that the hose, when installed, is tightly gripping the shank of the nipple fitting. The outer diameter of the hose 48 is slightly larger than the diameter as the inner diameter of the spring 46. The outer diameter of the spring is forced outward by the insertion of the hose, and the spring then touches the cylindrical wall 44 of the fitting 38. Thereby, the enlarged beaded portion 42 is sufficient to cause the coil 46' to tightly grip and, to a degree, be embedded in the elastomeric outer surface of the hose when rightward disconnecting force is applied to the hose. In assembling operation, the assembler merely has to insert the hose end over the enlarged bead of the nipple and push the hose inward with respect to the cylindrical housing 38. The end of the hose is automatically guided into the inner diameter portion of the spring and the end coil 46' rests near the enlarged portion 52 of the hose caused by the bead 42. Once the end 54 of the hose engages the portion 36 of the fitting, a rightward pull or tug on the hose will thereafter cause the coil 46' to sufficiently grip the hose and prevent disconnecting movement of the hose with respect to the nipple fitting.

Although only a single preferred embodiment of the subject connector has been illustrated, it is understood that the invention is described in the claims that follow.

I claim:

1. A connector for an elastic hose in the form of a composite assembly facilitating connection of a bare hose end thereto solely by insertive force on the hose, comprising:

an elongated nipple-shaped member having a cylindrical main body portion of slightly larger diameter than the inner diameter of the hose, the nipple portion also having an end base portion of significantly larger diameter than the body portion to form a stop for limiting the insertion of the hose over the body portion of the nipple member and the nipple member further having a relatively large diameter bead portion on the end opposite the base portion to first receive the hose thereover when it is pushed over the fitting to cause the hose to be radially enlarged in the vicinity of the bead portion;

a housing with a hollow cylindrical interior coaxially encircling the main body portion of the nipple-shaped member, the housing having an end wall attached to the nipple member near the base portion thereof and further having an opposite open end forming a radial space about the bead portion of the nipple sufficient to permit insertion of the bare hose end therethrough;

an elongated coil-type wire spring coaxially within the cylindrical interior of the housing with one end thereof engaging the housing base portion and an opposite free end terminating near the nipple's bead portion, the coil spring having a generally tubular shape with an outer diameter and an inner diameter defining a cylindrical spring interior whereby insertive movement of the hose end into the housing and over the nipple causes the hose portion extending over the main body portion and past the bead portion of the nipple to slide into the interior of the coil spring and produce a tightly gripping operative connection with the inner diameter spring portion when an opposite disconnecting force is exerted on the hose which causes the free end of the coil spring to move slightly with the hose toward the radially enlarged portion caused by the bead portion thereby causing the outer surface of the hose to press against and portions thereof to move between the coils of the spring.

2. A connector as set forth in claim 1 in which the dimension of the nipple's enlarged bead is sufficient to radially expand the outer wall of the hose toward the encircling housing so that the annular clearance therebetween is significantly smaller than the wire diameter of the coil spring.

3. A connector as set forth in claim 1 in which the diameter of the main body portion is just sufficiently larger than the interior diameter of the hose to provide space between the outer diameter of the hose and the housing interior so that the coil spring may slip over the hose end and extend toward the enlarged portion of the hose produced by the bead portion.

4. A connector as set forth in claim 1 in which the dimension of the nipple base portion is sufficient to form an axial stop when engaged by the end of the hose thereby preventing over insertion of the hose within the connector and to thereby signal full insertion of the hose.

5. In a vehicle having a tank for engine coolant partially defined by an apertured wall, a composite hose connector assembly supported by the tank wall and adapted to operatively accept an elastomeric hose to transmit fluid therefrom through the connector and the apertured wall, comprising:

a connector including an elongated nipple-shaped member which is axially passaged to transmit fluid between a hose receiving end portion and an opposite end base portion supported by the apertured tank wall, the base portion being of sufficient dimension with respect to the aperture in the wall to permit sealing engagement with the tank wall about the aperture therethrough, the base portion having a portion extending through the wall's aperture;

the nipple-shaped member also having an elongated main body portion integrally connected with the base portion and adapted to extend from the tank wall to a free end adapted to receive the flexible hose as it is pushed thereover;

a hollow cylindrical housing encircling the elongated main body portion and having an encircling interior wall surface thereabout, the housing further having an apertured first end engaging the base of the member and being axially movable thereon to adjustably retain the tank wall between portions of the base portion and the first end of the housing, the housing having an opposite second end encircling the free end of the main body portion and providing sufficient space therebetween to receive the hose end during a connecting movement of the hose over the nipple-shaped member;

a coil-shaped wire spring supported within the cylindrical interior of the housing with one end thereof resting against the first end of the housing and an opposite second end terminating near the free end of the main body portion;

a radially enlarged bead formed at the free end of the main body portion to produce radial expansion of the hose wall as it insertably slides over the bead portion of the nipple-shaped member whereafter the hose radially contracts around the main body portion to permit the hose to slide over and past the bead and subsequently contract around the lesser diameter main body portion adjacent the bead and hence into the coil spring which correspondingly slides over the outer surface of the hose allowing the second end of the spring to grip the hose tightly adjacent the radial enlargement to prevent the hose from being moved in a disconnecting direction away from the connector by the resultant interference between the second end of the spring and the enlarged portion of the hose as radially restrained by the encircling cylindrical housing.

* * * * *